United States Patent
Uchida

(10) Patent No.: US 9,998,682 B2
(45) Date of Patent: Jun. 12, 2018

(54) IMAGING APPARATUS, IMAGING APPARATUS BODY, AND METHOD OF CONTROLLING IMAGING APPARATUS

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/720,450

(22) Filed: Sep. 29, 2017

(65) Prior Publication Data

US 2018/0027163 A1 Jan. 25, 2018

Related U.S. Application Data

(63) Continuation of application No. PCT/JP2016/057216, filed on Mar. 8, 2016.

(30) Foreign Application Priority Data

Mar. 30, 2015 (JP) .................................. 2015-069483

(51) Int. Cl.
*H04N 5/238* (2006.01)
*H04N 5/232* (2006.01)
(Continued)

(52) U.S. Cl.
CPC ........... *H04N 5/238* (2013.01); *H04N 5/2254* (2013.01); *H04N 5/2351* (2013.01); *H04N 5/23232* (2013.01); *H04N 5/2352* (2013.01)

(58) Field of Classification Search
CPC .. H04N 5/238; H04N 5/2254; H04N 5/23232; H04N 5/2352; H04N 5/23212; H04N 5/2351
See application file for complete search history.

(56) References Cited

U.S. PATENT DOCUMENTS

2001/0017985 A1* 8/2001 Tsuboi ..................... G02B 3/14
                                                        396/506
2005/0041949 A1    2/2005 Onuki et al.
(Continued)

FOREIGN PATENT DOCUMENTS

CN         101031033 A    9/2007
CN         102809877 A    12/2012
(Continued)

OTHER PUBLICATIONS

International Search Report dated May 17, 2016, issued in PCT/JP2016/057216 (Form PCT/ISA/210).
(Continued)

*Primary Examiner* — Hung Lam
(74) *Attorney, Agent, or Firm* — Birch, Stewart, Kolasch & Birch, LLP

(57) ABSTRACT

The imaging apparatus includes a stop, an APD filter, a ND filter, an imaging element, a main control section, a photometric section, a program diagram storage section, and an imaging exposure determination section. The ND filter can be inserted into or removed from the optical path. The photometric section calculates a photometric value from an imaging signal which is obtained by the imaging element. The program diagram storage section stores a program diagram in which an aperture value is fixed at an open aperture value at a specific amount of exposure or less. The imaging exposure determination section determines imaging exposure on the basis of an amount of imaging exposure which is calculated from photometric value and the program diagram. The main control section inserts the ND filter in the optical path in a case where the amount of imaging exposure is greater than the specific amount of exposure.

14 Claims, 15 Drawing Sheets

(51) Int. Cl.
  *H04N 5/225*  (2006.01)
  *H04N 5/235*  (2006.01)

(56) References Cited

U.S. PATENT DOCUMENTS

| | | |
|---|---|---|
| 2007/0206941 A1 | 9/2007 | Maruyama et al. |
| 2012/0327267 A1 | 12/2012 | Takahara |
| 2014/0016125 A1* | 1/2014 | Sullivan ............. G01N 21/9501 356/237.5 |
| 2017/0126948 A1* | 5/2017 | Uchida ................ H04N 5/2351 |
| 2017/0171460 A1* | 6/2017 | Irie .................... H04N 5/23212 |
| 2017/0180631 A1* | 6/2017 | Furuta ................ H04N 5/23212 |
| 2017/0199365 A1* | 7/2017 | Czaniera ................ G02B 21/22 |

FOREIGN PATENT DOCUMENTS

| | | |
|---|---|---|
| JP | 63-206729 A | 8/1988 |
| JP | 10-268382 A | 10/1998 |
| JP | 11-289487 A | 10/1999 |
| JP | 2005-62733 A | 3/2005 |

OTHER PUBLICATIONS

Written Opinion of the International Searching Authority dated May 17, 2016, issued in PCT/JP2016/057216 (Form PCT/ISA/237).
Chinese Office Action dated Mar. 20, 2018 for Chinese Application No. 201680019238.6.

* cited by examiner

IMAGING APPARATUS, IMAGING APPARATUS BODY, AND METHOD OF CONTROLLING IMAGING APPARATUS

CROSS-REFERENCE TO RELATED APPLICATIONS

This application is a Continuation of PCT International Application No. PCT/JP2016/057216 filed on Mar. 8, 2016, which claims priority under 35 U.S.C § 119(a) to Japanese Patent Application No. 2015-069483 filed on Mar. 30, 2015. The above application is hereby expressly incorporated by reference, in its entirety, into the present application.

BACKGROUND OF THE INVENTION

1. Field of the Invention

The present invention relates to an imaging apparatus comprising an apodization filter, an imaging apparatus body, and a method of controlling the imaging apparatus.

2. Description of the Related Art

In the past, there are known imaging apparatuses comprising apodization filters (hereinafter referred to as an APD filter) (refer to JP2005-62733A (corresponding to US2005/0041949A1)). The APD filter has an optical characteristic that light transmittance is lower at a position farther from the optical axis. Consequently, a dimming effect obtained by the APD filter becomes larger as an aperture value becomes closer to an open aperture value.

The APD filter decreases an amount of peripheral light in only blurred images (out-of-focus points of light and the like), which are out of focus, without decreasing an amount of peripheral light on the image plane, and gives gradation to the outlines of the blurred images, thereby realizing beautiful blurring. In order to realize beautiful blurring through the APD filter, it is necessary for a blurred image to occur in a background of a main subject. In order to generate a blurred image in the background, it is necessary to lower a depth of field, and it is necessary for a stop to be opened as much as possible and to be preferably set as a fully open stop.

JP2005-62733A describes a method of automatically determining imaging exposure (imaging aperture value and imaging shutter speed) on the basis of a program diagram for APD in a case where the APD filter is inserted in the optical axis. In the program diagram for APD (hereinafter referred to as a second program diagram), in order to preferentially determine an open aperture value as the imaging aperture value, a region, in which the aperture value is fixed at the open aperture value, is set to be large as compared with a normal program diagram (hereinafter referred to as a first program diagram). Hence, in the second program diagram, as compared with the first program diagram, in order to preferentially determine an open aperture value as the imaging aperture value, a high-speed imaging shutter speed may be used. In a case where the imaging shutter speed is increased, there is a concern about a problem such as flickering. However, in a case of using the APD filter, in order to preferentially generate a blurred image of the background, the imaging shutter speed should be increased.

In the imaging apparatus described in JP2005-62733A, in a case where the APD filter is not inserted, the first program diagram is used. However, in the imaging apparatus, in accordance with insertion and removal of the APD filter, switching to the second program diagram is not performed. Thus, in cases of inserting and removing the APD filter, there is a problem in that a user has to perform operations relating to the switching of the program diagrams.

JP1988-206729A (JP-S63-206729A) describes, as in the APD filter, an imaging apparatus which is configured to be capable of inserting and removing a soft focus filter into and from the optical axis. The soft focus filter is a filter for achieving beautiful blurring in blurred images occurring in a background of a main subject. Also in the imaging apparatus described in JP1988-206729A (JP-S63-206729A), the first and second program diagrams are used. JP1988-206729A (JP-S63-206729A) proposes a method of automatically switching program diagrams in accordance with insertion and removal of the soft focus filter such that it is not necessary for a user to perform the operations relating to the switching of the program diagrams.

Further, in description of JP1988-206729A (JP-S63-206729A), in order to increase a range in which the open aperture value is set to be available as the imaging aperture value, the soft focus filter is inserted in the optical axis, a neutral density filter is inserted, and narrowing down of the stop is suppressed.

Also in the imaging apparatus of JP2005-62733A, it is conceivable to automatically switch between the first program diagram and the second program diagram in accordance with insertion and removal of the APD filter by applying the technique described in JP1988-206729A (JP-S63-206729A). Further, in the APD filter, in a case where the stop is narrowed down, a dimming effect is rapidly reduced. Thus, in a manner similar to that of JP1988-206729A (JP-S63-206729A), it is preferable that the neutral density filter is inserted in conjunction with insertion of the APD filter.

However, in a case where the APD filter is inserted and the neutral density filter is inserted, in a range in which the imaging aperture value is determined as the open aperture value on the basis of the second program diagram, the imaging shutter speed is uniformly delayed by the amount of dimming performed by the neutral density filter. Therefore, there is a problem in that blurring tends to occur due to the insertion of the APD filter and the insertion of the neutral density filter. This problem is worse as the imaging shutter speed is slower.

This problem occurs not only in a case of the imaging apparatus in which the APD filter is inserted into or removed from the optical path, but also in a case of the imaging apparatus in which the APD filter is disposed on the optical path and only a program diagram for APD is used.

SUMMARY OF THE INVENTION

The present invention has an object to provide an imaging apparatus capable of increasing a range in which an open aperture value is set to be available through a neutral density filter and reducing occurrence of blurring, an imaging apparatus body, and a method of controlling the imaging apparatus.

An imaging apparatus of the present invention comprises an imaging element, a stop, a photometric section, an apodization filter, a program diagram storage section, an imaging exposure determination section, a neutral density filter, and a control section. An imaging element photoelectrically converts incident light so as to output an imaging signal. A stop adjusts a light amount of the incident light. A photometric section performs photometry on the basis of the imaging signal. An apodization filter is disposed on an optical path of the incident light. The program diagram storage section stores a first program diagram in which an aperture value is fixed at an open aperture value at a first amount of exposure or less and a second program diagram in which an aperture value is fixed at an open aperture value at a second amount of exposure, which is greater than the first amount of exposure, or less. The imaging exposure determination section selects the first program diagram in a case where the apodization filter is not disposed on the optical path, selects the second program diagram in a case where the apodization filter is disposed on the optical path, and determines one group of an imaging aperture value and an imaging shutter speed, on the basis of an amount of imaging exposure which is calculated from a photometric value obtained by the photometric section. The neutral density filter is inserted into or removed from the optical path. The control section inserts the neutral density filter in the optical path in a case where the apodization filter is disposed on the optical path and a case where the amount of imaging exposure is greater than the second amount of exposure.

It is preferable that a shutter speed corresponding to the second amount of exposure in the second program diagram is faster than a shutter speed corresponding to the first amount of exposure in the first program diagram.

It is preferable that the imaging apparatus further comprises a mechanical shutter. In addition, it is preferable that the shutter speed corresponding to the second amount of exposure in the second program diagram is faster than the shutter speed corresponding to the first amount of exposure in the first program diagram, and is equal to or less than a limit speed on a high speed side of the mechanical shutter.

It is preferable that the imaging apparatus further comprises a mechanical shutter. It is preferable that the imaging element has an electronic shutter function. It is preferable that the shutter speed corresponding to the second amount of exposure in the second program diagram is faster than a limit speed on a high speed side of the mechanical shutter. In addition, it is preferable that in a case where the imaging shutter speed is faster than the limit speed, the imaging shutter speed is set through the electronic shutter function.

It is preferable that the control section inserts the neutral density filter in the optical path in a case where the amount of imaging exposure is equal to or greater than a third amount of exposure greater than the second amount of exposure. In addition, it is preferable that an aperture value corresponding to the third amount of exposure in the second program diagram is greater than the open aperture value.

It is preferable that the apodization filter obtains an apodization effect in a case where an aperture value is equal to or less than a threshold value. In addition, it is preferable that an aperture value corresponding to the third amount of exposure in the second program diagram corresponds to the threshold value.

It is preferable that in the first program diagram, in a range greater than the first amount of exposure, an aperture value is set as a discrete value.

It is preferable that in the second program diagram, in a range greater than the second amount of exposure, an aperture value is set as a discrete value.

It is preferable that the apodization filter obtains an apodization effect in a case where an aperture value is equal to or less than a threshold value. In addition, it is preferable that in the second program diagram, in a range from a fourth amount of exposure greater than the second amount of exposure to a fifth amount of exposure greater than the fourth amount of exposure, an aperture value is fixed at the threshold value.

It is preferable that the control section inserts the neutral density filter in the optical path in a case where the amount of imaging exposure is equal to or greater than the fourth amount of exposure.

It is preferable that in the second program diagram, in a range from the second amount of exposure to the fourth amount of exposure, and in a range greater than the fifth amount of exposure, an aperture value is set as a discrete value.

It is preferable that the imaging element is a CMOS sensor, and the electronic shutter function is a rolling shutter system.

On an imaging apparatus body of the present invention, a lens barrel having an apodization filter is mounted. The imaging apparatus body comprises an imaging element, a stop, a photometric section, a program diagram storage section, an imaging exposure determination section, a neutral density filter, a control section. An imaging element photoelectrically converts incident light so as to output an imaging signal. A stop adjusts a light amount of the incident light. A photometric section performs photometry on the basis of the imaging signal. The program diagram storage section stores a first program diagram in which an aperture value is fixed at an open aperture value at a first amount of exposure or less and a second program diagram in which an aperture value is fixed at an open aperture value at a second amount of exposure, which is greater than the first amount of exposure, or less. The imaging exposure determination section selects the first program diagram in a case where the apodization filter is not disposed on the optical path, selects the second program diagram in a case where the apodization filter is disposed on the optical path, and determines one group of an imaging aperture value and an imaging shutter speed, on the basis of an amount of imaging exposure which is calculated from a photometric value obtained by the photometric section. The neutral density filter is inserted into or removed from the optical path. The control section inserts the neutral density filter in the optical path in a case where the apodization filter is disposed on the optical path and a case where the amount of imaging exposure is greater than the second amount of exposure.

According to the present invention, there is provided a method of controlling an imaging apparatus including an imaging element that photoelectrically converts incident light so as to output an imaging signal, a stop that adjusts a light amount of the incident light, a photometric section that performs photometry on the basis of the imaging signal, an apodization filter that is disposed on an optical path of the incident light, a program diagram storage section that stores a first program diagram in which an aperture value is fixed at an open aperture value at a first amount of exposure or less and a second program diagram in which an aperture value is fixed at an open aperture value at a second amount of exposure, which is greater than the first amount of exposure, or less, an imaging exposure determination section that selects the first program diagram in a case where the apodization filter is not disposed on the optical path, selects the second program diagram in a case where the apodization filter is disposed on the optical path, and determines one group of an imaging aperture value and an imaging shutter speed, on the basis of an amount of imaging exposure which is calculated from a photometric value obtained by the photometric section, and a neutral density filter that is inserted into or removed from the optical path. The method of controlling the imaging apparatus comprises inserting the neutral density filter in the optical path in a case where the apodization filter is disposed on the optical path and a case where the amount of imaging exposure is greater than the second amount of exposure.

According to the present invention, in the case where the apodization filter is disposed on the optical path, an exposure value may be greater than the specific amount of exposure (may exceed a region in which the aperture value is fixed at the open aperture value). In this case, the neutral density filter is inserted in the optical path. Therefore, it is possible to increase a range in which the open aperture value is set to be available through the neutral density filter, and it is possible to reduce occurrence of blurring.

DESCRIPTION OF THE PREFERRED EMBODIMENTS

First Embodiment

Figure 1:
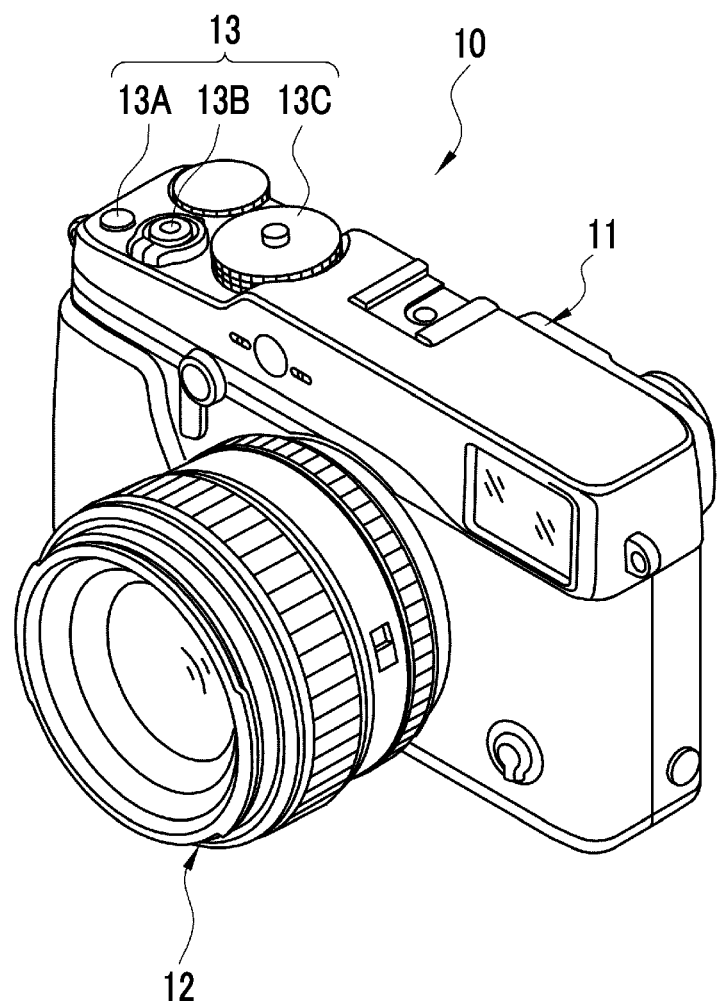
FIG. 1 is an external perspective view of an imaging apparatus of a first embodiment.

In FIG. 1, the imaging apparatus 10 of the present invention is an interchangeable lens type digital camera, and comprises an imaging apparatus body 11 and a first lens barrel 12 which is detachably mounted on the imaging apparatus body 11. The first lens barrel 12 is a lens barrel which has an apodization (APD) filter 22 (refer to FIG. 2).

In the imaging apparatus body 11, an operation section 13 is provided. The operation section 13 includes a power button 13A, a shutter button 13B, a mode switch dial 13C, and the like. The power button 13A operates in a case where power of the imaging apparatus 10 is turned on/off.

The shutter button 13B is a two-stage-stroke-type switch which is capable of so-called "half pressing" and "full pressing". The shutter button 13B outputs an S1-on signal through half pressing, and outputs an S2-on signal through full pressing which is more pressed than half pressing. The imaging apparatus 10 performs imaging preparation processing such as auto focus adjustment (AF) control or auto exposure control in a case where the S1-on signal is output from the shutter button 13B, and performs imaging processing in a case where the S2-on signal is output.

The mode switch dial 13C is operated in a case of switching operation modes. The operation modes include a still image capturing mode and a reproduction mode. In the still image capturing mode, still image capturing is performed by fully pressing the shutter button 13B during live view display. In the reproduction mode, a still image stored in a memory 44 (refer to FIG. 2) is reproduced. In the live view display, no image is recorded, and image display is performed in real time on the display section 42 (refer to FIG. 2).

Figure 2:
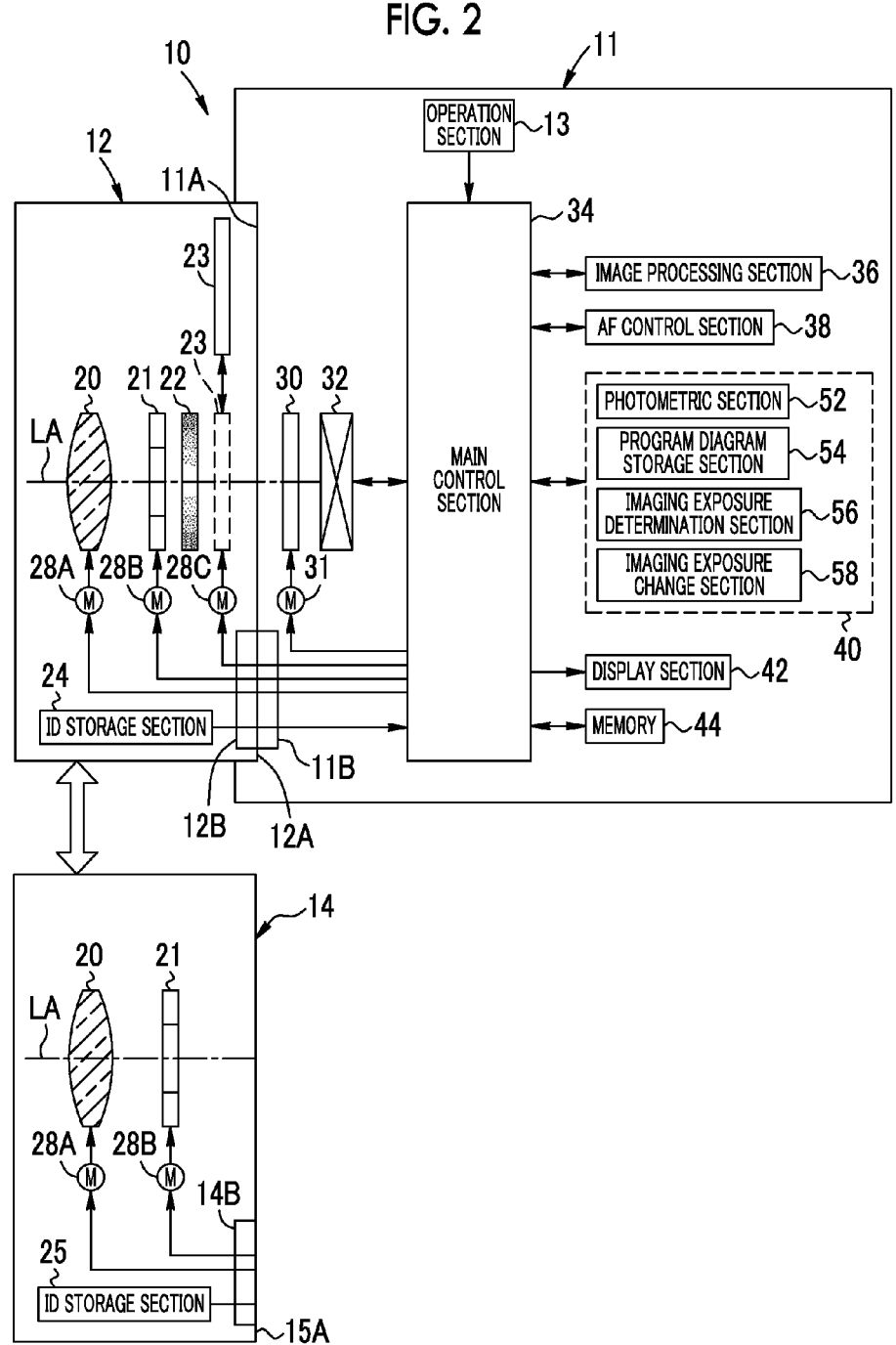
FIG. 2 is a block diagram illustrating a configuration of the imaging apparatus of the first embodiment.

In FIG. 2, a lens barrel mount section 11A is provided on the imaging apparatus body 11. A proximal end portion 12A of the first lens barrel 12 is mounted on the lens barrel mount section 11A. An electrical contact point 11B is provided on the lens barrel mount section 11A. The electrical contact point 11B comes into contact with an electrical contact point 12B, which is provided on the proximal end portion 12A, so as to electrically connect the imaging apparatus body 11 and the first lens barrel 12.

Further, in the imaging apparatus body 11, instead of the first lens barrel 12 having the APD filter 22, a second lens barrel 14 not having the APD filter 22 is detachably provided. In the second lens barrel 14, a proximal end portion 14A is mounted on the lens barrel mount section 11A of the imaging apparatus body 11. In a manner similar to that of the first lens barrel 12, an electrical contact point 14B, which comes into contact with the electrical contact point 11B of the lens barrel mount section 11A, is provided on the proximal end portion 14A of the second lens barrel 14.

The first lens barrel 12 has a focus lens 20, a stop 21, the APD filter 22, a neutral density (ND) filter 23, and an identification data (ID) storage section 24. The focus lens 20, the stop 21, and the APD filter 22, and the ND filter 23 are disposed on an optical axis LA of the first lens barrel 12, in order from the subject side. The optical axis LA corresponds to an optical path of light incident from the subject.

The second lens barrel 14 has a focus lens 20, a stop 21, and an ID storage section 25. The focus lens 20 and the stop 21 are disposed on an optical axis LA of the second lens barrel 14, in order from the subject side.

The focus lens 20 concentrates light incident from the subject, and forms an image thereof. Further, the focus lens 20 moves in a direction of the optical axis LA through driving of a motor 28A, on the basis of control of a main control section 34 to be described later, and adjusts an imaging distance. The motor 28A is a stepping motor or a servo motor.

The stop 21 adjusts the amount of incident light. The stop 21 moves a plurality of stop blades (not shown in the drawing) through driving of the motor 28B on the basis of the control of the main control section 34 to be described later, and changes the amount of light incident onto the imaging element 32 to be described later. The motor 28B is a stepping motor or a servo motor.

The ID storage sections 24 and 25 store IDs for specifying kinds of the lens barrels. The IDs are used for specifying whether or not the APD filter 22 is present through the main control section 34 to be described later. The ID storage section 24 of the first lens barrel 12 stores IDs including information that the APD filter 22 is provided. The ID storage section 25 of the second lens barrel 14 stores IDs including information that the APD filter 22 is not provided.

The IDs stored in the ID storage section 24 are transmitted to the imaging apparatus body 11 through the electrical contact points 11B and 12B in a case where the imaging apparatus body 11 and the first lens barrel 12 are connected. Further, the IDs stored in the ID storage section 25 are transmitted to the imaging apparatus body 11 through the electrical contact points 11B and 14B in a case where the imaging apparatus body 11 and the second lens barrel 14 are connected.

Figure 3:
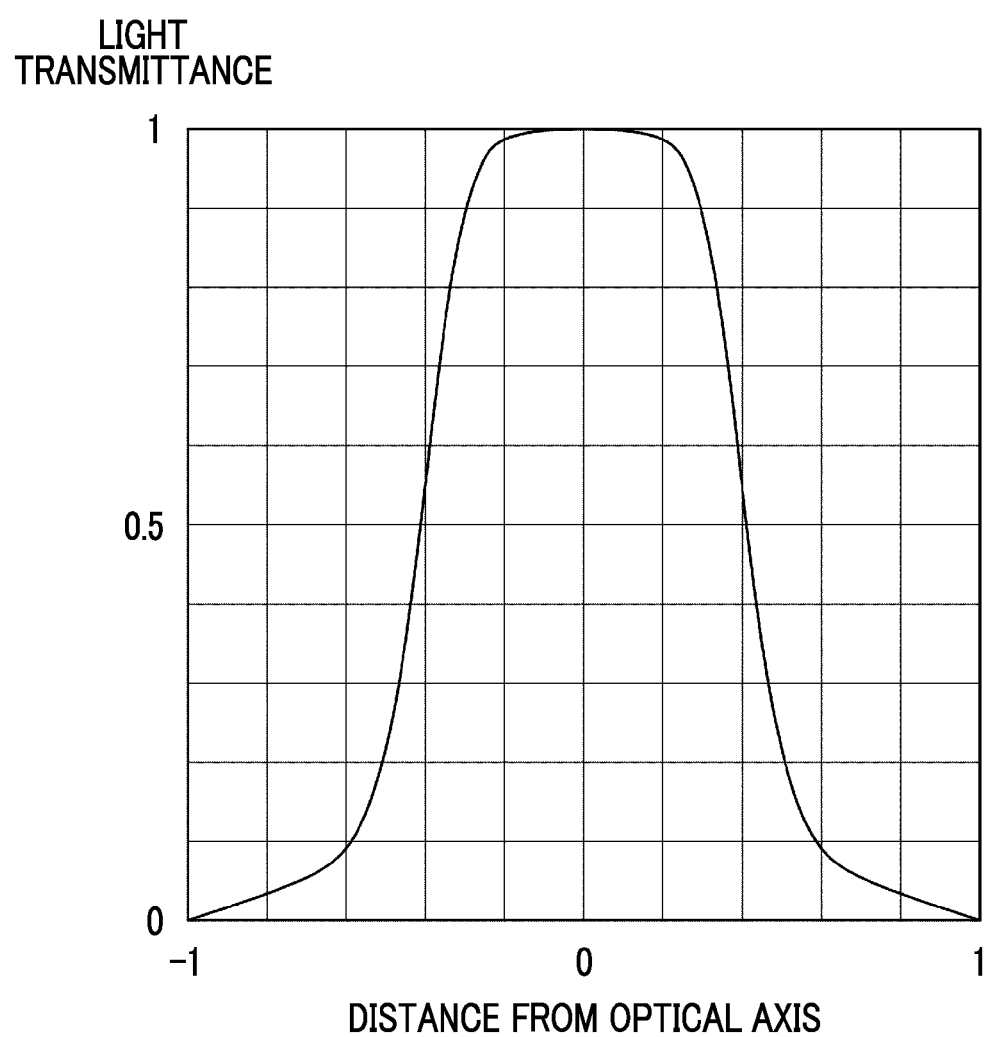
FIG. 3 is an explanatory diagram of an optical characteristic of an APD filter.

As shown in FIG. 3, the APD filter 22 has an optical characteristic that light transmittance becomes lower as the distance from the optical axis LA becomes larger. The APD filter 22 decreases the amount of peripheral light in blurred images (out-of-focus points of light and the like), which are out of focus, without decreasing an amount of peripheral light on the image plane. Due to such an optical characteristic, the APD filter 22 gives gradation to the outlines of the blurred images, whereby it is possible to obtain an apodization effect of realizing beautiful blurring.

An amount of dimming of the APD filter 22 becomes larger as the aperture value (F number) of the stop 21 becomes closer to an open value. The F number is an aperture value defined by an effective aperture diameter of the stop 21, where a transmittance of light within an effective aperture region is not considered. An actual aperture value, in which the transmittance of light P within the effective aperture region is considered, is a T value. The T value is generally represented by Expression (1).

$$T = F/P^{1/2} \quad (1)$$

In a case where the light transmittance of the APD filter 22 is applied to the light transmittance P of Expression (1), it is possible to obtain the T value in which the optical characteristic of the APD filter 22 is considered. A relationship between the T value and the F number is indicated by a curve shown in FIG. 4. A difference between the T value and the F number becomes larger as the F number becomes closer to the open value.

In the present embodiment, in the APD filter 22, in a case where the F number is greater than 2.8, the amount of dimming becomes almost zero, and thus it is possible to obtain a dimming effect in a region in which the F number is equal to or less than 2.8. That is, a threshold value Fth of the F number capable of obtaining an apodization effect is "2.8".

Figure 4:
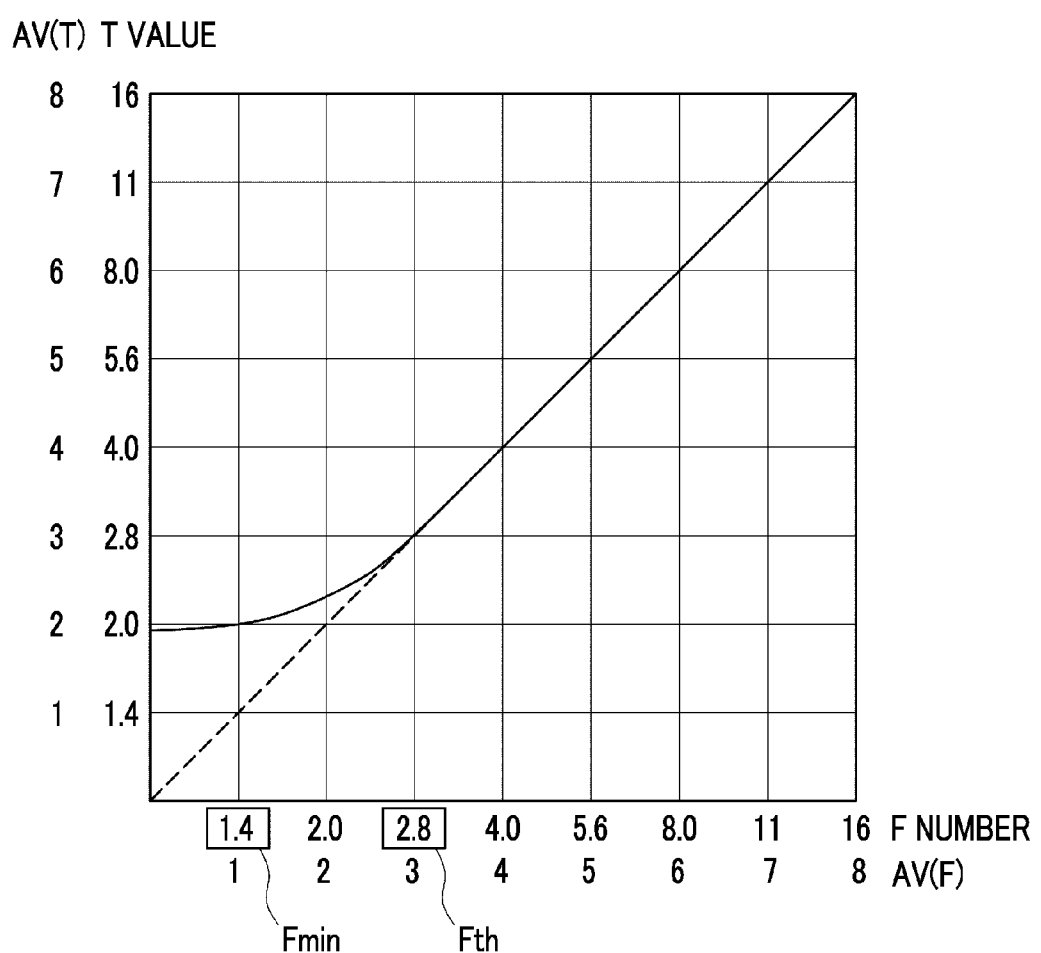
FIG. 4 is a graph illustrating a relationship between an F number and a T value.

In FIG. 4, an AV(F) and an AV(T) defined by Expressions (2) and (3) are described. The AV(F) is an aperture value (AV) corresponding to the F number. The AV(T) is an AV corresponding to the T value.

$$AV(F) = 2 \times \log_2(F) \quad (2)$$

$$AV(T) = 2 \times \log_2(T) \quad (3)$$

In the present embodiment, an open aperture value Fmin of the stop 21 is "1.4". According to FIG. 4, the T value corresponding to the open aperture value Fmin is "2.0". Consequently, the amount of dimming, which is performed by the APD filter 22 in a case where the stop 21 is set at the open aperture value Fmin, corresponds to a value (value at which the light amount is set to ½ thereof) corresponding to one stage of AV.

The ND filter 23 is a neutral density filter that uniformly reduces a light amount of incident light regardless of the distance from the optical axis LA. The ND filter 23 is detachably disposed on the optical axis LA (an optical path of the incident light). The ND filter 23 moves between a non-insertion position (the solid line in FIG. 2) and an insertion position (the dashed line in FIG. 2) by driving a motor 28C on the basis of control of the main control section 34. In addition, in the present embodiment, the amount of dimming, which is performed by the ND filter 23 in a case where the stop 21 is set at the open aperture value Fmin, corresponds to a value (value at which the light amount is set to ½ thereof) corresponding to one stage of AV.

Inside the imaging apparatus body 11, a shutter unit 30, an imaging element 32, a main control section 34, an image processing section 36, an AF control section 38, an exposure control section 40, a display section 42, a memory 44 are provided.

The shutter unit 30 is a mechanical shutter such as a focal plane shutter. The shutter unit 30 is provided to block the optical path between the lens barrel mount section 11A and the imaging element 32. The shutter unit 30 drives the shutter motor 31 on the basis of control of the main control section 34 to be described later, thereby performing opening and closing operations.

The imaging element 32 photoelectrically converts the incident light which is incident through the shutter unit 30, and outputs an imaging signal. The imaging signal, which is output from the imaging element 32, is input to the image processing section 36. The imaging element 32 is a complementary metal oxide semiconductor (CMOS) sensor, and has an electronic shutter function. The shutter speed of the electronic shutter function can be controlled by the main control section 34.

The main control section 34 comprises a central processing unit (CPU), a read only memory (ROM) which stores parameters and programs used in the CPU, a random access memory (RAM) which is used as a work memory for the CPU, and the like (any of those is not shown in the drawing). Other processing sections (such as the image processing section, the AF control section and the exposure control section) are configured by the CPU executing corresponding programs. The main control section 34 is electrically connected to respective sections of the imaging apparatus 10, and integrally controls the entirety of the imaging apparatus 10, on the basis of the operation signals which are input from the operation section 13. The main control section 34 receives the S1-on signal and the S2-on signal from the shutter button 13B. Further, the main control section 34 specifies the operation modes, which are currently set, by using the mode switch dial 13C. The main control section 34 corresponds to the "control section" of the claims.

The main control section 34 receives the IDs from the ID storage sections 24 and 25 through the electrical contact point 11B. The main control section 34 specifies a kind (whether it is the first lens barrel 12 or the second lens barrel 14) of the lens barrel connected to the imaging apparatus body 11, on the basis of the received ID.

Further, the main control section 34 determines whether the APD filter 22 is present, on the basis of the specified kind of the lens barrel. Specifically, the main control section 34 determines that the APD filter 22 is present in a case where the specified lens barrel is the first lens barrel 12, and determines that the APD filter 22 is not present in a case where the specified lens barrel is the second lens barrel 14. Then, the main control section 34 transmits the determination result as APD filter information to an imaging exposure determination section 56.

The image processing section 36 generates image data from the imaging signal which is sent from the imaging element 32. The image processing section 36 transmits the generated image data to the display section 42 and the memory 44. The display section 42 displays an image based on the image data. The memory 44 stores the image data. Further, the image processing section 36 generates a luminance signal by performing Y/C conversion on the received imaging signal, and transmits the generated luminance signal to the exposure control section 40.

The AF control section 38 executes AF control through a contrast AF method, on the basis of the imaging signal. In the AF control, while the focus lens 20 is moved, the AF evaluation value (a value of summation of high-frequency wave components) is calculated on the basis of the imaging signal. Then, the AF control section 38 detects a position (in-focus position) of the focus lens 20 at which the AF evaluation value becomes the maximum, and moves the focus lens 20 to the in-focus position. The AF evaluation value corresponds to the contrast of the image. An AF area in an imaging range of imaging performed by the imaging element 32 is, for example, a central region of the imaging range.

The exposure control section 40 determines an amount of exposure, a shutter speed, and an aperture value (hereinafter referred to as an amount of imaging exposure, an imaging shutter speed, and an imaging aperture value) which are optimal for imaging, on the basis of the luminance signal. The exposure control section 40 comprises a photometric section 52, a program diagram storage section 54, an imaging exposure determination section 56, and an imaging exposure change section 58.

The photometric section 52 calculates a photometric value on the basis of the luminance signal which is sent from the image processing section 36, thereby performing photometry on a subject. The photometric section 52 transmits the calculated photometric value to the imaging exposure determination section 56.

Figure 5:
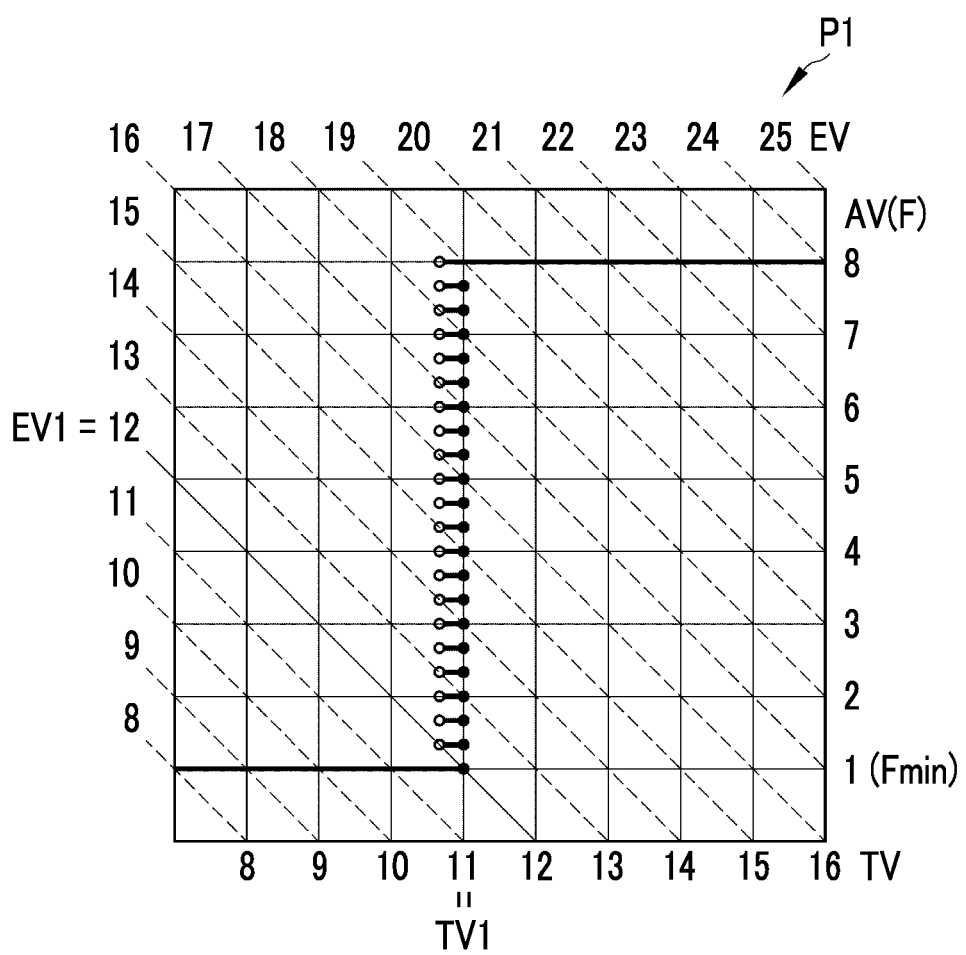
FIG. 5 is a diagram illustrating a first program diagram of the first embodiment.
Figure 6:
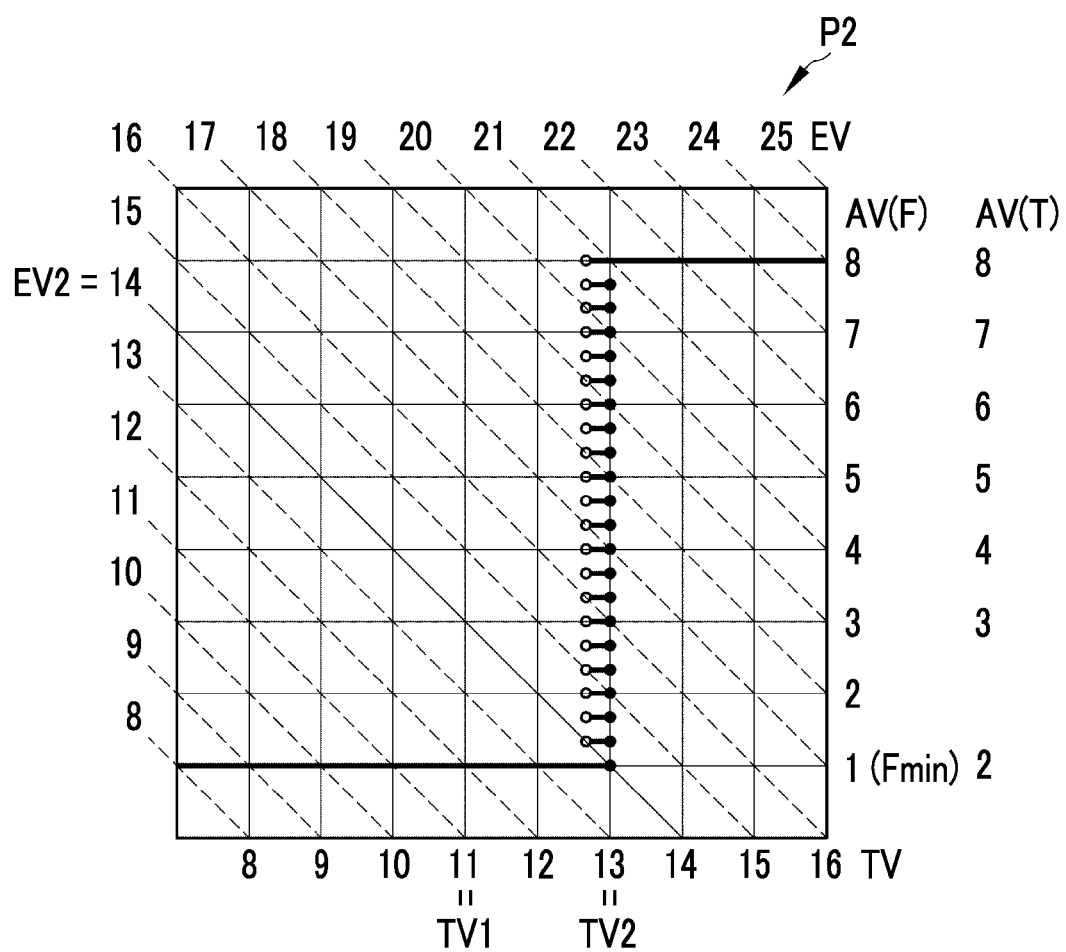
FIG. 6 is a diagram illustrating a second program diagram of the first embodiment.

The program diagram storage section 54 stores a first program diagram P1, which is shown in FIG. 5, and a second program diagram P2 which is shown in FIG. 6. The first and second program diagrams P1 and P2 show the exposure value (EV), the AV, and the time value (TV) satisfying Arithmetic Expression (4) of an additive system of photographic exposure (APEX). In the first and second program diagrams P1 and P2, one group of AV and TV corresponds to one EV.

$$EV=AV+TV \quad (4)$$

EV shows an amount of exposure. TV shows a relationship between the shutter speed t (unit: seconds) and Expression (5).

$$TV=-\log_2(t) \quad (5)$$

In the first and second program diagrams P1 and P2, the AV is represented by using the above-mentioned AV(F).

The first and second program diagrams P1 and P2 are the multi-stage stop type. In the multi-stage stop type program diagram, since the AV takes discrete values, the imaging aperture value (AV) is prevented from frequently changing in accordance with change in amount of imaging exposure EV calculated from the photometric value.

The first program diagram P1 is used in a case where the second lens barrel 14 not having the APD filter 22 is connected to the imaging apparatus body 11. In the first program diagram P1, an aperture value is fixed at the open aperture value Fmin in the region where an amount of exposure EV is equal to or less than the first amount of exposure EV1. The open aperture value Fmin corresponds to "AV(F)=1". In the present embodiment, EV1=12. Further, the shutter speed TV1 corresponding to the first amount of exposure EV1 is "11".

The second program diagram P2 is used in a case where the first lens barrel 12 not having the APD filter 22 is connected to the imaging apparatus body 11. In the second program diagram P2, an aperture value is fixed at the open aperture value Fmin in the region in which an amount of exposure EV is equal to or less than a second amount of exposure EV2. The second amount of exposure EV2 is a value greater than the first amount of exposure EV1. In the present embodiment, EV2=15. In the second program diagram P2, the region, in which the aperture value is fixed at the open aperture value Fmin, is longer than the first program diagram P1. In the second program diagram, as compared with the case of the first program diagram, the open aperture value Fmin as the imaging aperture value is more preferentially determined.

A shutter speed TV2 corresponding to the second amount of exposure EV2 is "13". The shutter speed TV2 is faster than the shutter speed TV1 corresponding to the first amount of exposure EV1 of the first program diagram P1. In the present embodiment, the shutter speed TV2 is a limit speed on a high speed side of the shutter unit 30.

Figure 7:
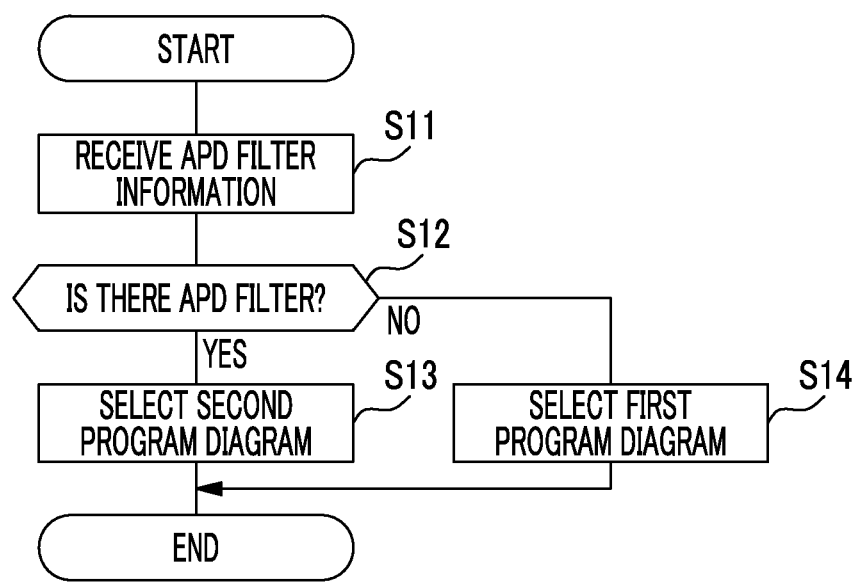
FIG. 7 is a flowchart for selecting the program diagram.

In an imaging preparation step, the imaging exposure determination section 56 selects either one of the first program diagram P1 or the second program diagram P2, on the basis of the APD filter information. Specifically, as shown in FIG. 7, the imaging exposure determination section 56 receives the APD filter information from the main control section 34 (S11), and selects the second program diagram P2 (S13) in a case where the APD filter 22 is present on the optical path (YES in S12). In contrast, in a case where the APD filter 22 is not present on the optical path (NO in S12), the imaging exposure determination section 56 selects the first program diagram P1 (S14).

The imaging exposure determination section 56 performs predetermined calculation on the basis of a photometric value which is sent from the photometric section 52, during auto exposure control, and thereby calculates an amount of imaging exposure EVa appropriate for imaging. The imaging exposure determination section 56 determines one group of the imaging aperture value and the imaging shutter speed, on the basis of the amount of imaging exposure EVa, by using the selected program diagram.

In a case where the APD filter 22 is present on the optical path, the main control section 34 determines whether or not the amount of imaging exposure Eva is greater than the second amount of exposure EV2, and inserts the ND filter 23 in the optical path in a case where the amount of imaging exposure Eva is greater than the second amount of exposure EV2. In addition, the ND filter 23 is outside the optical path in an initial state. In a case where the amount of imaging exposure Eva is equal to or less than the second amount of exposure EV2, the main control section 34 leaves the ND filter 23 outside the optical path.

The imaging exposure change section 58 operates in a case where the ND filter 23 is inserted in the optical path. Specifically, the imaging exposure change section 58 changes imaging exposure, which is determined by the imaging exposure determination section 56, by only an amount corresponding to the amount of dimming, which is performed by the ND filter 23, on the basis of the second program diagram P2. In the present embodiment, the amount of dimming, which is performed by the ND filter 23, is one stage (1 EV). Therefore, the imaging exposure change section 58 determines one group of the imaging aperture value and the imaging shutter speed, on the basis of an amount of imaging exposure EVb which is lowered by one stage from the amount of imaging exposure EVa. The imaging exposure change section 58 transmits the changed imaging aperture value and the changed imaging shutter speed to the main control section 34.

Figure 8:
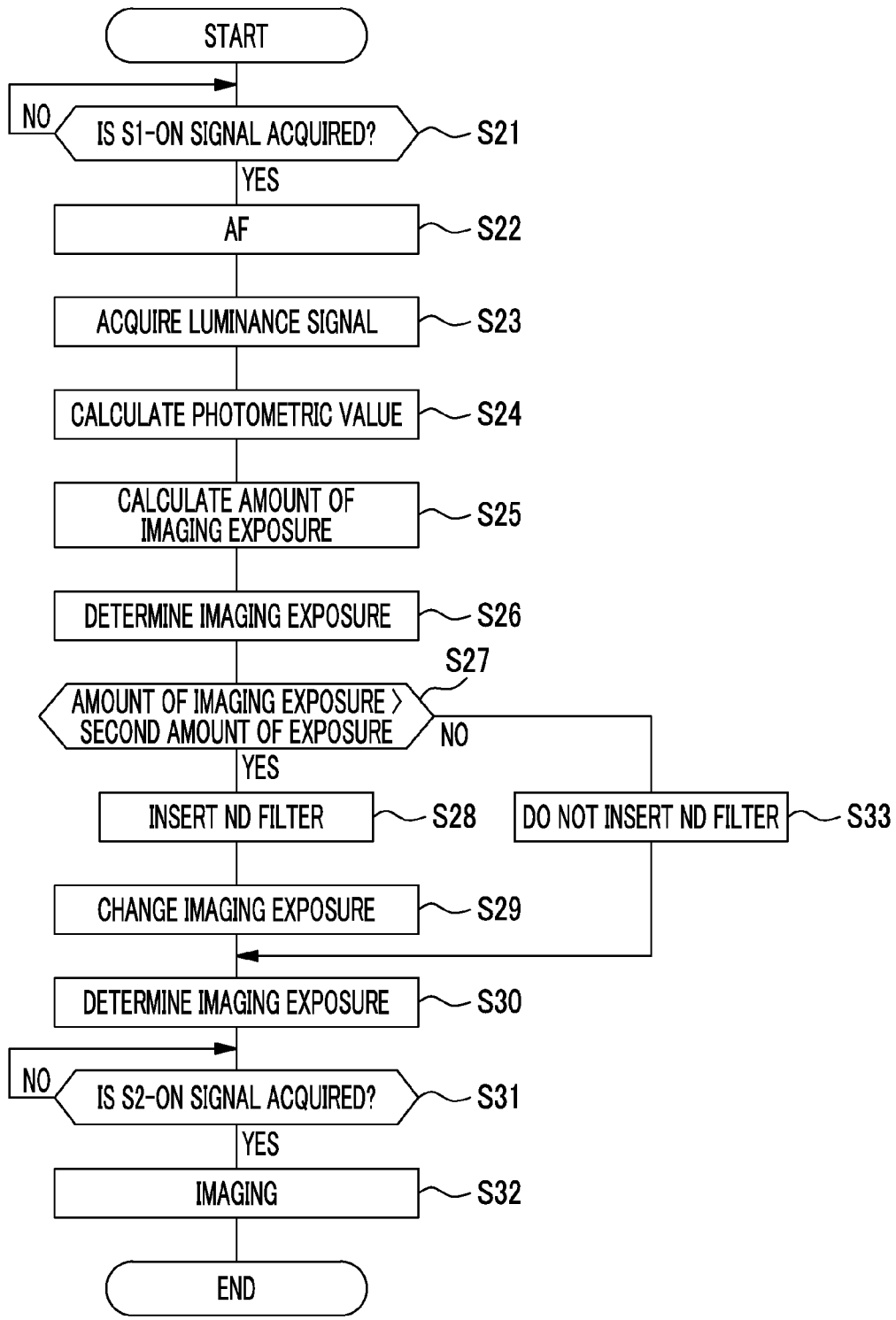
FIG. 8 is a flowchart of still image capturing using the second program diagram.

Next, a description will be given of an effect in a case of the still image capturing mode of the imaging apparatus 10 in which the first lens barrel 12 having the APD filter 22 is mounted on the imaging apparatus body 11, with reference to a flowchart shown in FIG. 8. In this case, as the program diagram used in determining the imaging exposure, the second program diagram P2 is selected.

In the imaging apparatus 10, in a case where the still image capturing mode is set, live view display is performed. In a case where the shutter button 13B is pressed halfway during the live view display and the main control section 34 acquires the S1-on signal (YES in step S21), the AF control section 38 executes the above-mentioned AF control (step S22).

The image processing section 36 acquires the luminance signal from the imaging signal (step S23), and transmits the luminance signal to the photometric section 52. The photometric section 52 calculates the photometric value of the subject on the basis of the received luminance signal (step S24), and transmits the photometric value to the imaging exposure determination section 56. The imaging exposure determination section 56 calculates the amount of imaging exposure EVa on the basis of the received photometric value (step S25). Then, the imaging exposure determination section 56 determines imaging exposure (the imaging aperture value and the imaging shutter speed) on the basis of the amount of imaging exposure EVa by using the second program diagram P2 (step S26).

Figure 9:
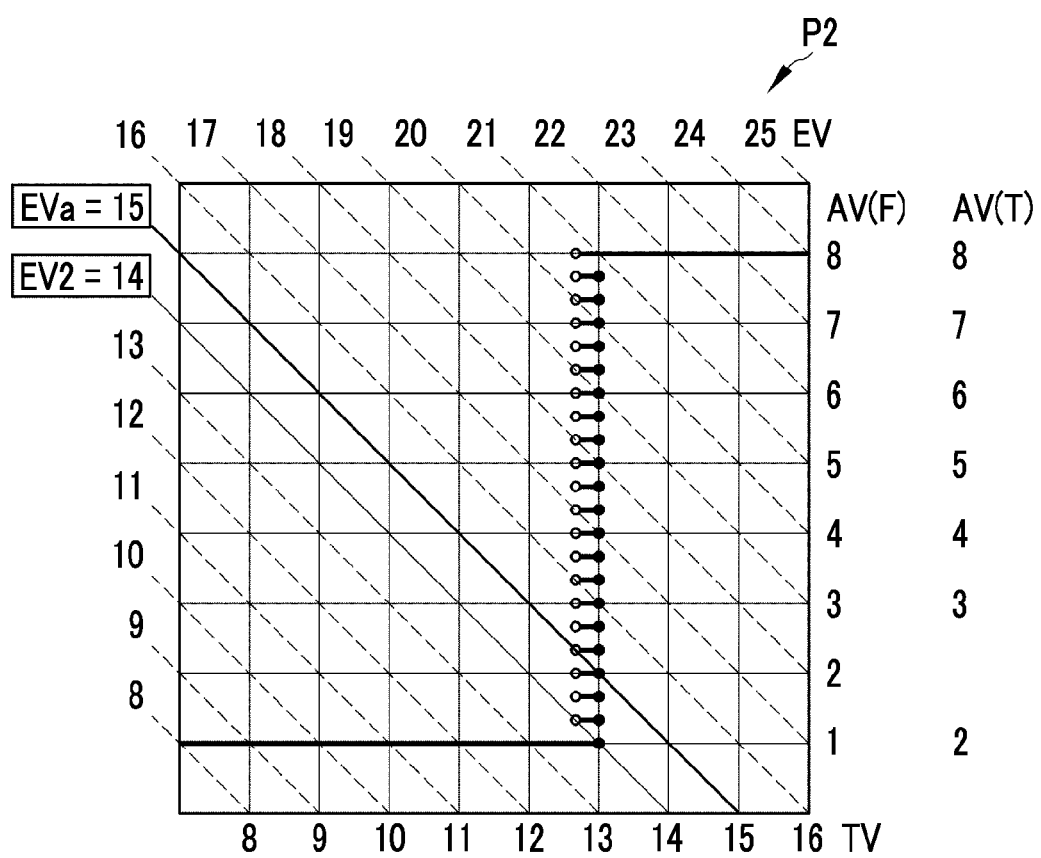
FIG. 9 is an explanatory diagram illustrating an example in which an ND filter is inserted.

The main control section 34 determines whether or not the amount of imaging exposure EVa is greater than the second amount of exposure EV2 (step S27). In a case where the amount of imaging exposure EVa is greater than the second amount of exposure EV2 (YES in step S27), and the main control section 34 inserts the ND filter 23 in the optical axis LA (step S28). For example, as shown in FIG. 9, in a case where the amount of imaging exposure EVa is "15", the main control section 34 inserts the ND filter 23 in the optical path.

Figure 10:
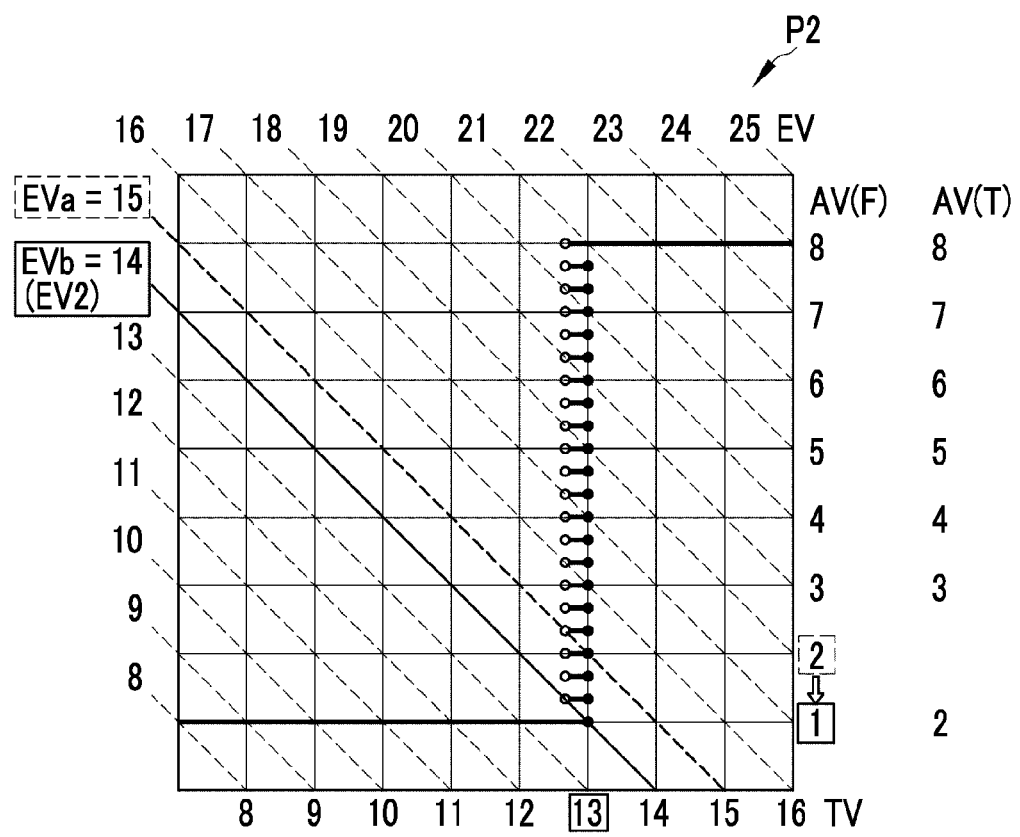
FIG. 10 is an explanatory diagram illustrating changing of imaging exposure.

In a case where the ND filter 23 is inserted, the imaging exposure change section 58 changes imaging exposure, which is determined in step S26, by only an amount corresponding to the amount of dimming which is performed by the ND filter 23. For example, as shown in FIG. 10, in a case where the amount of imaging exposure EVa is "15", the imaging exposure is changed to imaging exposure which is determined on the basis of a value (EVb=14) which is the amount of imaging exposure lowered by an amount of dimming caused by insertion of the ND filter 23. In this case, among the values of the imaging exposure (AV(F)=2, TV=13) before the change, the imaging aperture value is changed to the open aperture value (AV(F)=1).

In contrast, in step S27, in a case where it is determined that the amount of imaging exposure EVa is equal to or less than the second amount of exposure EV2 (EVa≤EV2) (step S33), the main control section 34 does not insert the ND filter 23 in the optical path, and leaves the ND filter 23 outside the optical path. In this case, the imaging exposure change section 58 does not change imaging exposure. In a region where EVa≤EV2, the imaging aperture value, which is determined in step S26, is the open aperture value (AV(F)=1).

Then, the main control section 34 uses the imaging exposure, which is determined in step S26, in a case where EVa≤EV2, uses the imaging exposure, which is changed in step S29 in a case where EVa>EV2, performs setting of the imaging aperture value in the stop 21, and performs setting of the imaging shutter speed in the shutter unit 30 (step S30).

After the setting of the imaging exposure, in a case where the shutter button 13B is pressed fully and the main control section 34 acquires the S2-on signal (YES in step S31), a still image is captured (step S32).

As described above, in a case where the first lens barrel 12 having the APD filter 22 is mounted on the imaging apparatus body 11, the amount of imaging exposure may exceed the region in which the aperture value is fixed at the open aperture value (EVa>EV2). In this case, the ND filter 23 is inserted in the optical path. In the present invention, as in the related art, the APD filter is inserted in the optical path, and ND filter is inserted in the optical path. Thereby, the imaging shutter speed is not uniformly delayed, and occurrence of blurring caused by a decrease in the imaging shutter speed is reduced.

Second Embodiment

In the first embodiment, as the operation modes of the imaging apparatus 10, a still image capturing mode and a reproduction mode are provided. However, in a second embodiment, a moving image capturing mode is provided. The moving image capturing mode can be switched by the mode switch dial 13C. In the moving image capturing mode, moving image capturing is performed by fully pressing the shutter button 13B during live view display. Hereinafter, the moving image capturing mode will be described.

Figure 11:
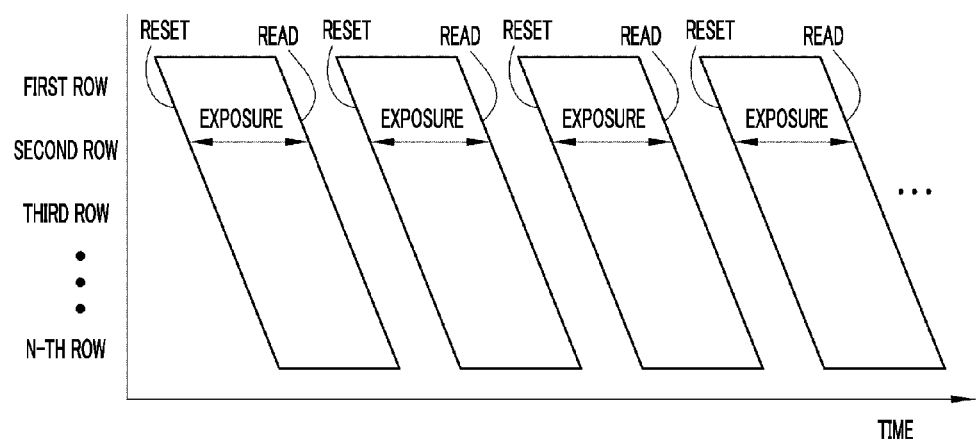
FIG. 11 is an explanatory diagram for explaining imaging operations of a rolling shutter system.

The imaging element 32 performs an imaging operation in a rolling shutter system. As shown in FIG. 11, the imaging element 32 performs resetting of electric charge, exposure, and reading of accumulated electric charge, for each pixel row. Therefore, the exposure time period differs for each pixel row. In a case of moving image capturing mode, resetting and reading operations from the first pixel row to the last pixel row are repeatedly performed.

Figure 12:
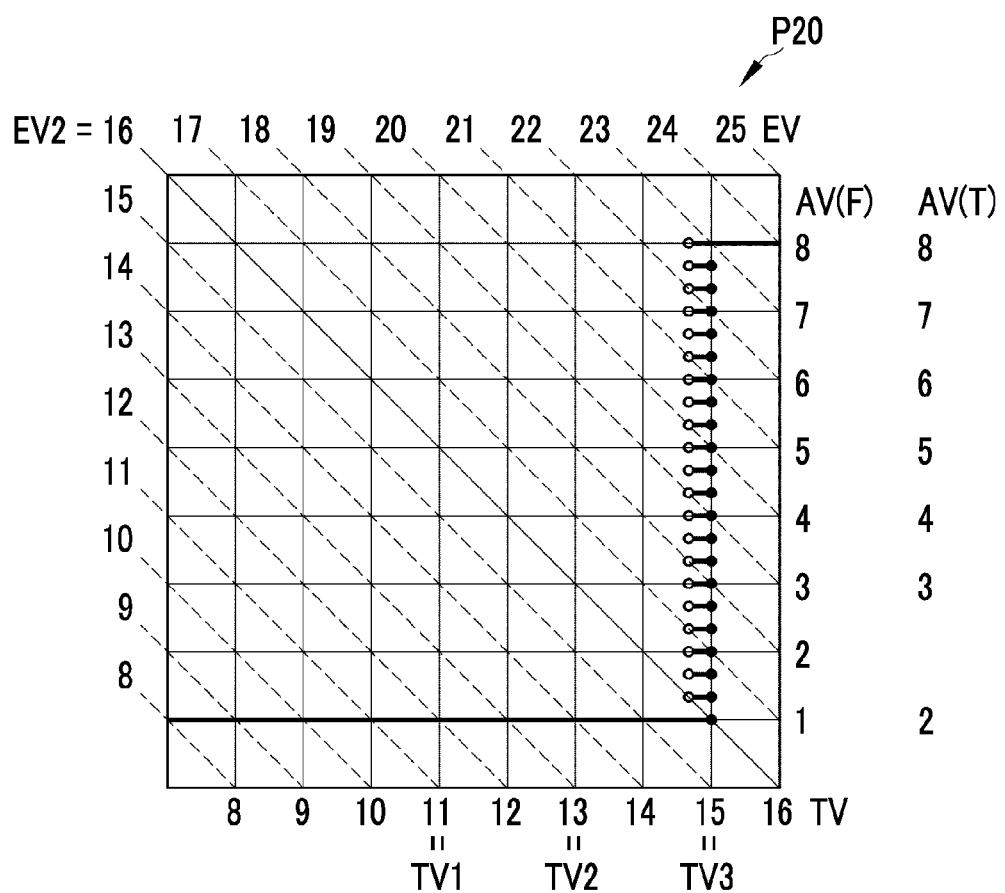
FIG. 12 is a diagram illustrating a second program diagram of a second embodiment.

In FIG. 12, in a second program diagram P20 of the second embodiment, in a region where the amount of exposure EV is equal to or less than the second amount of exposure EV2, the aperture value is fixed at the open aperture value, and thus EV2=16. A shutter speed TV3 corresponding to the second amount of exposure EV2 is set to be faster than a limit speed TV2 on the high speed side of the shutter unit 30, and thus TV3=15. In a manner similar to that of the first embodiment, the second program diagram P20 is used in a case where the APD filter 22 is disposed on the optical path.

The main control section 34 performs setting of the aperture value of the stop 21 on the basis of the amount of imaging exposure determined on the basis of the second program diagram P20, controls the imaging element 32, and performs setting of the shutter speed of the electronic shutter function. The other configuration of the present embodiment is the same as that of the first embodiment.

In the second program diagram P20 of the present embodiment, compared with the second program diagram P2 (refer to FIG. 6) of the first embodiment, the range, in which the aperture value is fixed at the open aperture value, is extended on the high amount of exposure side. Hence, in the present embodiment, compared with the first embodiment, it is possible to reduce occurrence of blurring without narrowing down the stop.

In addition, in the example of the present embodiment, the second program diagram P20 is applied to the moving image capturing mode, but the second program diagram P20 may be applied to the still image capturing mode.

In addition, in the present embodiment, the imaging element 32 performs the imaging operation in the rolling shutter system, but may use a global shutter system. In the CMOS sensor, a transfer transistor is provided between a photo diode (PD) as a photoelectric conversion element and a floating diffusion (FD) as a temporary charge retentive capacitance, and thereby light is blocked from the FD. As a result, it is possible to perform driving in the global shutter system.

As the global shutter system, by turning on the reset transistors and the transfer transistors of all pixels, resetting of electric charge is performed at once. After the predetermined exposure time period, by turning on the transfer transistors of all the pixels, transferring of signal charge to the FD is performed at once. Then, in a manner similar to the rolling shutter system, the signal is read for every pixel row.

In the CMOS sensor of the global shutter system, in a case where a surface irradiation system is used, it is necessary to reduce light receiving areas of the PDs by the number of necessary additional circuits such as the transfer transistors and the wires. Therefore, a back side irradiation system is preferable.

Third Embodiment

In the first embodiment, in a case where the amount of imaging exposure EVa is greater than the second amount of exposure EV2, the ND filter 23 is immediately inserted in the optical path. However, in the third embodiment, the amount of imaging exposure EVa may be equal to or greater than the third amount of exposure EV3 greater than the second amount of exposure EV2. In this case, the ND filter 23 is inserted in the optical path.

Figure 13:
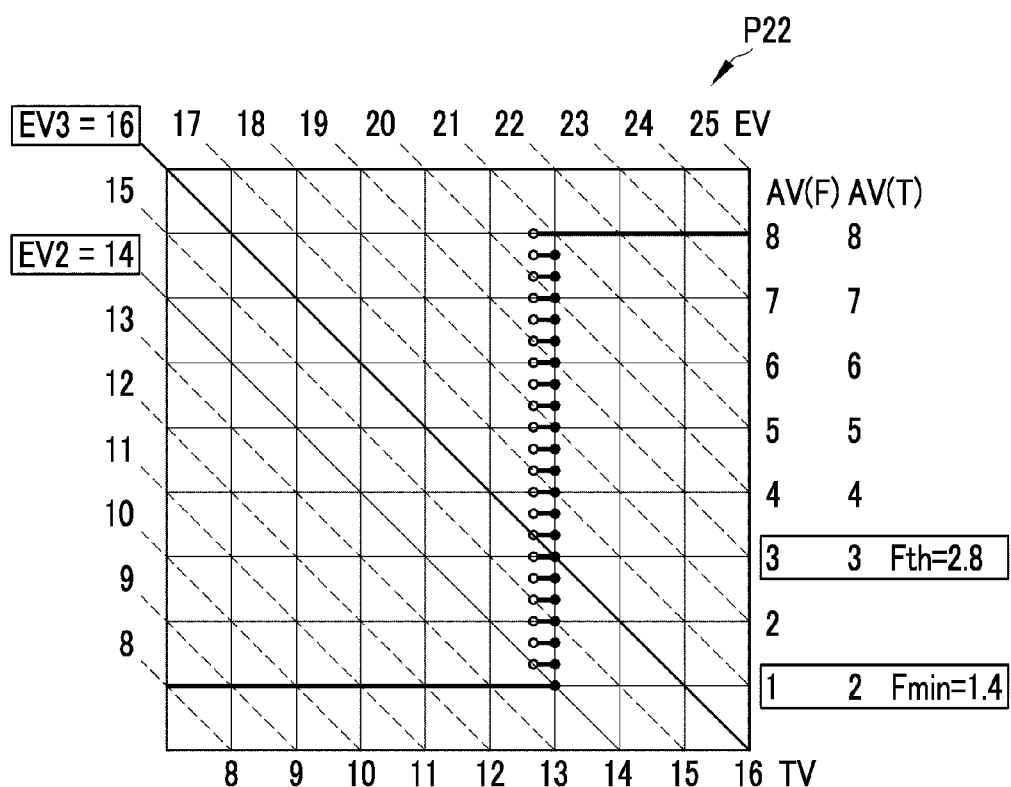
FIG. 13 is a diagram illustrating a second program diagram of a third embodiment.

In FIG. 13, in the second program diagram P22 of the third embodiment, in a region where the amount of exposure EV is equal to or less than the second amount of exposure EV2, the aperture value is fixed at the open aperture value Fmin, and thus EV2=14. The shutter speed corresponding to the second amount of exposure EV2 is set as the limit speed on the high speed side of the shutter unit 30, in a manner similar to that of the first embodiment. In a manner similar to that of the first embodiment, the second program diagram P22 is used in a case where the APD filter 22 is disposed on the optical path.

In a case where the amount of imaging exposure EVa is greater than the second amount of exposure EV2 less than the third amount of exposure EV3, the main control section 34 causes the ND filter 23 to be outside the optical path. In a case where the amount of imaging exposure Eva is equal to or greater than the third amount of exposure EV3, the main control section 34 inserts the ND filter 23 in the optical path. The third amount of exposure EV3 is "16". The aperture value corresponding to the third amount of exposure EV3 corresponds to the threshold value Fth capable of obtaining an apodization effect.

In the present embodiment, in a state where the ND filter 23 is outside the optical path, the stop is allowed to be narrowed down to the threshold value Fth at which the apodization effect can be obtained.

Fourth Embodiment

Figure 14:
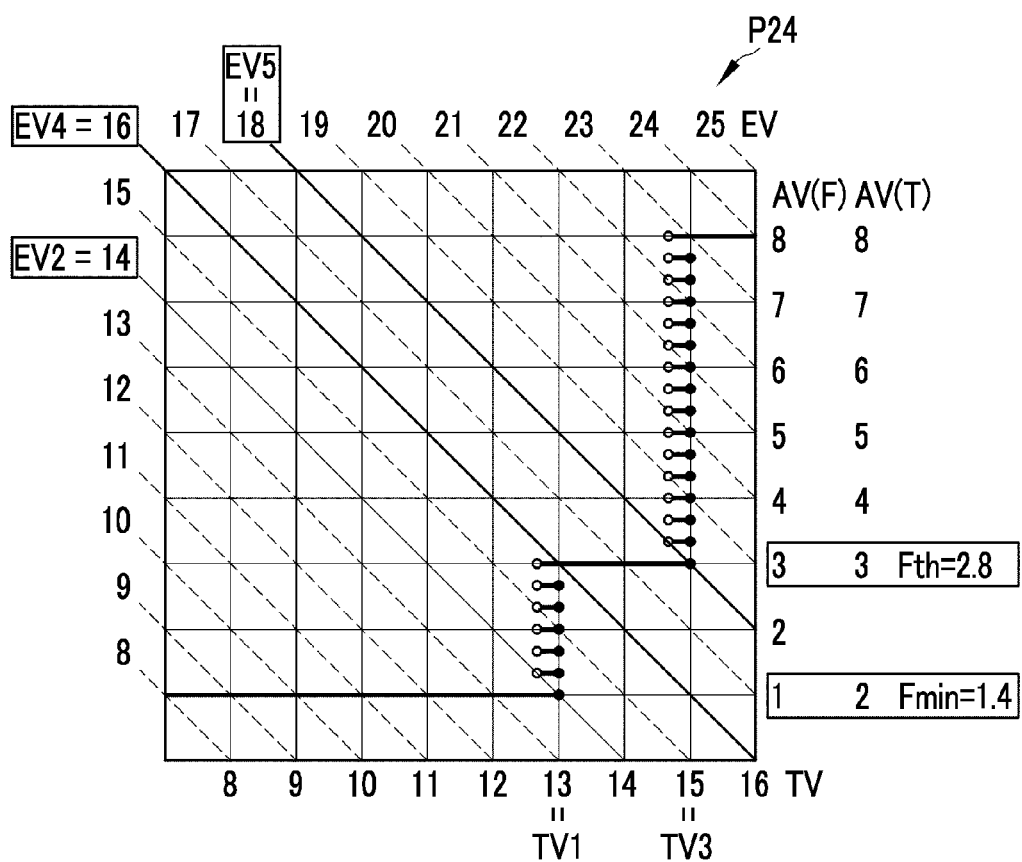
FIG. 14 is a diagram illustrating a second program diagram of a fourth embodiment.

In the fourth embodiment, a second program diagram P24 shown in FIG. 14 is used. In the second program diagram P24, the aperture value is fixed at the open aperture value in a range in which the amount of exposure EV is equal to or less than the second amount of exposure EV2, and the aperture value is fixed at the threshold value Fth in a range of the amount of exposure EV from the fourth amount of exposure EV4 to a fifth amount of exposure EV5. The fourth amount of exposure EV4 is a value greater than the second amount of exposure EV2. The fifth amount of exposure EV5 is a value greater than the fourth amount of exposure EV4. The fourth amount of exposure EV4 is "16", and the fifth amount of exposure EV5 is "18".

The shutter speed TV2 corresponding to the second amount of exposure EV2 is set as the limit speed on the high speed side of the shutter unit 30, and thus TV2=13. A shutter speed TV3 corresponding to the fifth amount of exposure EV5 is set to be faster than the TV2, and thus TV3=15. Further, the aperture value corresponding to the fifth amount of exposure EV5 corresponds to the threshold value Fth capable of obtaining the apodization effect. In a manner similar to that of the first embodiment, the second program diagram P24 is used in a case where the APD filter 22 is disposed on the optical path.

In a case where the amount of imaging exposure determined on the basis of the second program diagram P24 is equal to or less than the second amount of exposure EV2, the main control section 34 performs setting of the imaging shutter speed through the shutter unit 30. Further, in a case where the amount of imaging exposure determined on the basis of the second program diagram P24 is greater than the second amount of exposure EV2, the main control section 34 performs setting of the imaging shutter speed through the electronic shutter function of the imaging element 32. Furthermore, in a case where the amount of imaging exposure determined on the basis of the second program diagram P24 is greater than the fourth amount of exposure EV4, the main control section 34 inserts the ND filter 23 in the optical path.

In the present embodiment, in a state where the ND filter 23 is outside the optical path, the stop is allowed to be narrowed down to the threshold value Fth at which the apodization effect can be obtained. Further, in the present embodiment, by enabling the electronic shutter function to perform setting of the imaging shutter speed, a range capable of obtaining the apodization effect is extended to a high amount of exposure side.

Figure 15:
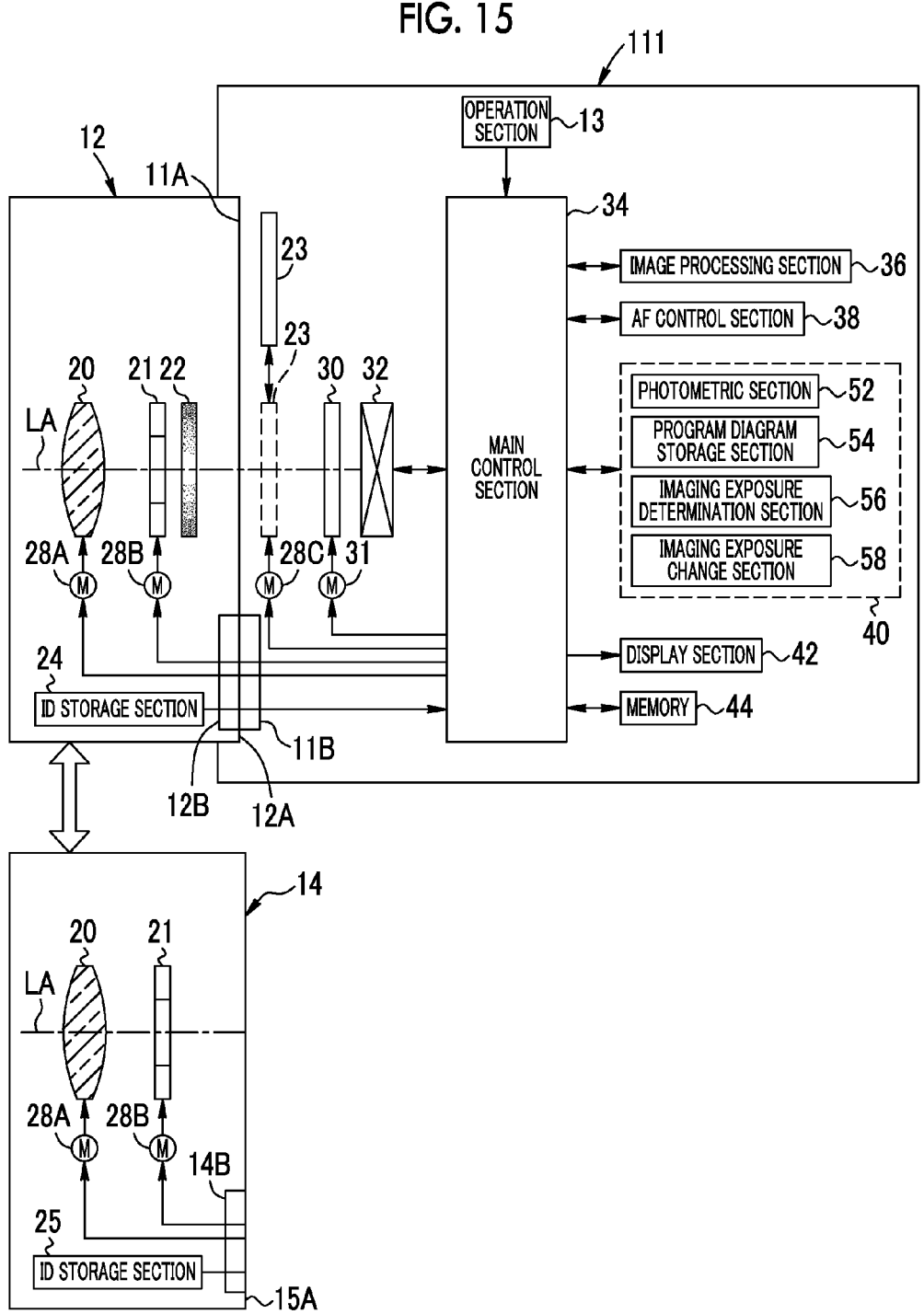
FIG. 15 is a block diagram illustrating a configuration of an imaging apparatus body having an ND filter.

In addition, in each embodiment, the ND filter 23 is provided in the first lens barrel 12. However, as shown in FIG. 15, the ND filter 23 is not provided in the first lens barrel 12, and the ND filter 23 may be provided in the imaging apparatus body 111. In the imaging apparatus body 111, the ND filter 23 is inserted into or removed from the optical path by driving the motor 28C on the basis of control of the main control section 34. The other configuration of the imaging apparatus body 111 is the same as the imaging apparatus body 11 of each embodiment.

Further, in each embodiment, the present invention exemplifies an interchangeable lens imaging apparatus from which the lens barrel and the imaging apparatus body are detachable. However, the present invention can be applied to an integrated type imaging apparatus in which a lens barrel and an imaging apparatus body are integrated. In the interchangeable lens imaging apparatus, the APD filter is inserted into or removed from the optical path by interchanging the lens barrel. In the integrated type imaging apparatus, a mechanism, in which the APD filter is inserted into or removed from the optical path, may be provided. In the integrated type imaging apparatus, in accordance with insertion and removal of the APD filter, the first program diagram and the second program diagram are selected.

Furthermore, in a case of the integrated type imaging apparatus, the APD filter may be fixed in the optical path without insertion and removal of the APD filter. In a case where the APD filter is fixedly disposed on the optical path, among the above-mentioned first program diagram and second program diagram, only the second program diagram may be used. In this case, the second amount of exposure EV2 corresponds to the "specific amount of exposure" of the claims.

Further, in each embodiment, a CMOS image sensor is used as the imaging element 32, but a charge coupled device (CCD) image sensor may be used.

In each embodiment, the AF control section 38 performs AF control through a contrast AF method, but may perform AF control through a phase difference AF method.

Further, in each embodiment, in a case where the ND filter 23 is inserted in the optical path, the imaging exposure change section 58 changes imaging exposure. However, it is not essential to change the imaging exposure, and the imaging exposure change section 58 does not have to be provided. The reason for this is that imaging exposure, in which the amount of dimming of the ND filter 23 is reflected, is determined by performing photometry and determination of imaging exposure again in a state where the ND filter 23 is inserted in the optical path even if the imaging exposure is not changed in a case where the ND filter 23 is inserted in the optical path. EXPLANATION OF REFERENCES 10: imaging apparatus
11, 111: imaging apparatus body
11A: lens barrel mount section
11B: electrical contact point
12: first lens barrel
12A: proximal end portion
12B: electrical contact point
13: operation section
13A: power button
13B: shutter button
13C: mode switch dial
14: second lens barrel
14A: proximal end portion
14B: electrical contact point
20: focus lens
21: stop
22: APD filter
23: ND filter (neutral density filter)
24, 25: ID storage section
28A, 28B, 28C: motor
30: shutter unit
31: shutter motor
32: imaging element
34: main control section (control section)
36: image processing section
38: AF control section
40: exposure control section
42: display section
44: memory
52: photometric section
54: program diagram storage section
56: imaging exposure determination section
58: imaging exposure change section
P1: first program diagram
P2, P20, P22, P24: second program diagram

What is claimed is:

1. An imaging apparatus comprising:
   an imaging element that photoelectrically converts incident light so as to output an imaging signal;
   a stop that adjusts a light amount of the incident light;
   a photometric section that performs photometry on the basis of the imaging signal;
   an apodization filter that is disposed on an optical path of the incident light;
   a program diagram storage section that stores a first program diagram in which an aperture value is fixed at an open aperture value at a first amount of exposure or less and a second program diagram in which an aperture value is fixed at an open aperture value at a second amount of exposure, which is greater than the first amount of exposure, or less;
   an imaging exposure determination section that selects the first program diagram in a case where the apodization filter is not disposed on the optical path, selects the second program diagram in a case where the apodization filter is disposed on the optical path, and determines one group of an imaging aperture value and an imaging shutter speed, on the basis of an amount of imaging exposure which is calculated from a photometric value obtained by the photometric section;
   a neutral density filter that is inserted into or removed from the optical path; and
   a control section that inserts the neutral density filter in the optical path in a case where the apodization filter is disposed on the optical path and a case where the amount of imaging exposure is greater than the second amount of exposure.

2. The imaging apparatus according to claim 1, wherein a shutter speed corresponding to the second amount of exposure in the second program diagram is faster than a shutter speed corresponding to the first amount of exposure in the first program diagram.

3. The imaging apparatus according to claim 2, further comprising a mechanical shutter,
   wherein the shutter speed corresponding to the second amount of exposure in the second program diagram is faster than the shutter speed corresponding to the first amount of exposure in the first program diagram, and is equal to or less than a limit speed on a high speed side of the mechanical shutter.

4. The imaging apparatus according to claim 2, further comprising a mechanical shutter,
   wherein the imaging element has an electronic shutter function,
   wherein the shutter speed corresponding to the second amount of exposure in the second program diagram is faster than a limit speed on a high speed side of the mechanical shutter, and
   wherein in a case where the imaging shutter speed is faster than the limit speed, the imaging shutter speed is set through the electronic shutter function.

5. The imaging apparatus according to claim 1,
   wherein the control section inserts the neutral density filter in the optical path in a case where the amount of imaging exposure is equal to or greater than a third amount of exposure greater than the second amount of exposure, and
   wherein an aperture value corresponding to the third amount of exposure in the second program diagram is greater than the open aperture value.

6. The imaging apparatus according to claim 5,
   wherein the apodization filter obtains an apodization effect in a case where an aperture value is equal to or less than a threshold value, and
   wherein an aperture value corresponding to the third amount of exposure in the second program diagram corresponds to the threshold value.

7. The imaging apparatus according to claim 1, wherein in the first program diagram, in a range greater than the first amount of exposure, an aperture value is set as a discrete value.

8. The imaging apparatus according to claim 1, wherein in the second program diagram, in a range greater than the second amount of exposure, an aperture value is set as a discrete value.

9. The imaging apparatus according to claim 4,
wherein the apodization filter obtains an apodization effect in a case where an aperture value is equal to or less than a threshold value, and
wherein in the second program diagram, in a range from a fourth amount of exposure greater than the second amount of exposure to a fifth amount of exposure greater than the fourth amount of exposure, an aperture value is fixed at the threshold value.

10. The imaging apparatus according to claim 9, wherein the control section inserts the neutral density filter in the optical path in a case where the amount of imaging exposure is equal to or greater than the fourth amount of exposure.

11. The imaging apparatus according to claim 9, wherein in the second program diagram, in a range from the second amount of exposure to the fourth amount of exposure, and in a range greater than the fifth amount of exposure, an aperture value is set as a discrete value.

12. The imaging apparatus according to claim 4, wherein the imaging element is a CMOS sensor, and the electronic shutter function is a rolling shutter system.

13. An imaging apparatus body on which a lens barrel having an apodization filter is mounted, the imaging apparatus body comprising:
an imaging element that photoelectrically converts incident light so as to output an imaging signal;
a stop that adjusts a light amount of the incident light;
a photometric section that performs photometry on the basis of the imaging signal;
a program diagram storage section that stores a first program diagram in which an aperture value is fixed at an open aperture value at a first amount of exposure or less and a second program diagram in which an aperture value is fixed at an open aperture value at a second amount of exposure, which is greater than the first amount of exposure, or less;
an imaging exposure determination section that selects the first program diagram in a case where the apodization filter is not disposed on the optical path, selects the second program diagram in a case where the apodization filter is disposed on the optical path, and determines one group of an imaging aperture value and an imaging shutter speed, on the basis of an amount of imaging exposure which is calculated from a photometric value obtained by the photometric section;
a neutral density filter that is inserted into or removed from the optical path; and
a control section that inserts the neutral density filter in the optical path in a case where the apodization filter is disposed on the optical path and a case where the amount of imaging exposure is greater than the second amount of exposure.

14. A method of controlling an imaging apparatus including an imaging element that photoelectrically converts incident light so as to output an imaging signal, a stop that adjusts a light amount of the incident light, a photometric section that performs photometry on the basis of the imaging signal, an apodization filter that is disposed on an optical path of the incident light, a program diagram storage section that stores a first program diagram in which an aperture value is fixed at an open aperture value at a first amount of exposure or less and a second program diagram in which an aperture value is fixed at an open aperture value at a second amount of exposure, which is greater than the first amount of exposure, or less, an imaging exposure determination section that selects the first program diagram in a case where the apodization filter is not disposed on the optical path, selects the second program diagram in a case where the apodization filter is disposed on the optical path, and determines one group of an imaging aperture value and an imaging shutter speed, on the basis of an amount of imaging exposure which is calculated from a photometric value obtained by the photometric section, and a neutral density filter that is inserted into or removed from the optical path, the method comprising
inserting the neutral density filter in the optical path in a case where the apodization filter is disposed on the optical path and a case where the amount of imaging exposure is greater than the second amount of exposure.

* * * * *